United States Patent [19]

Johnson

[11] 3,938,827

[45] Feb. 17, 1976

[54] BICYCLE INTERCONNECTING APPARATUS

[76] Inventor: Charles L. Johnson, 4235 E. McDowell Road, Space No. 100, Phoenix, Ariz. 85008

[22] Filed: Dec. 6, 1974

[21] Appl. No.: 530,352

[52] U.S. Cl. ................................ 280/209; 280/202
[51] Int. Cl.² ........................................ B62K 13/06
[58] Field of Search .................. 280/202, 203, 209

[56] References Cited
UNITED STATES PATENTS

| | | | |
|---|---|---|---|
| 822,688 | 6/1906 | Nicholas | 280/209 |
| 2,248,223 | 7/1941 | Fellman | 280/209 |
| 3,175,843 | 3/1965 | Burke | 280/209 |
| 3,592,486 | 7/1971 | Fox | 280/209 |
| 3,664,683 | 5/1972 | Gobby | 280/202 |
| 3,768,834 | 10/1973 | Singleton | 280/209 |
| 3,794,352 | 2/1974 | Popp | 280/209 |
| 3,865,401 | 2/1975 | Kingsly | 280/209 |

FOREIGN PATENTS OR APPLICATIONS

| | | | |
|---|---|---|---|
| 5,683 | 9/1898 | United Kingdom | 280/202 |
| 9,078 | 2/1899 | United Kingdom | 280/209 |

*Primary Examiner*—M. H. Wood, Jr.
*Assistant Examiner*—Terrance L. Siemens
*Attorney, Agent, or Firm*—Herbert E. Haynes, Jr.

[57] ABSTRACT

Interconnecting bars are employed to connect two standard bicycles in a side-by-side relationship. The bicycles are interconnected adjacent the respective rear axles thereof, adjacent their respective seats and adjacent the front of the frames thereof, for stabilizing the bicycles and are also interconnected at their respective steering mechanisms with a tie rod that is adjustable to allow setting of wheel toe-in for proper steering and handling characteristics.

6 Claims, 6 Drawing Figures

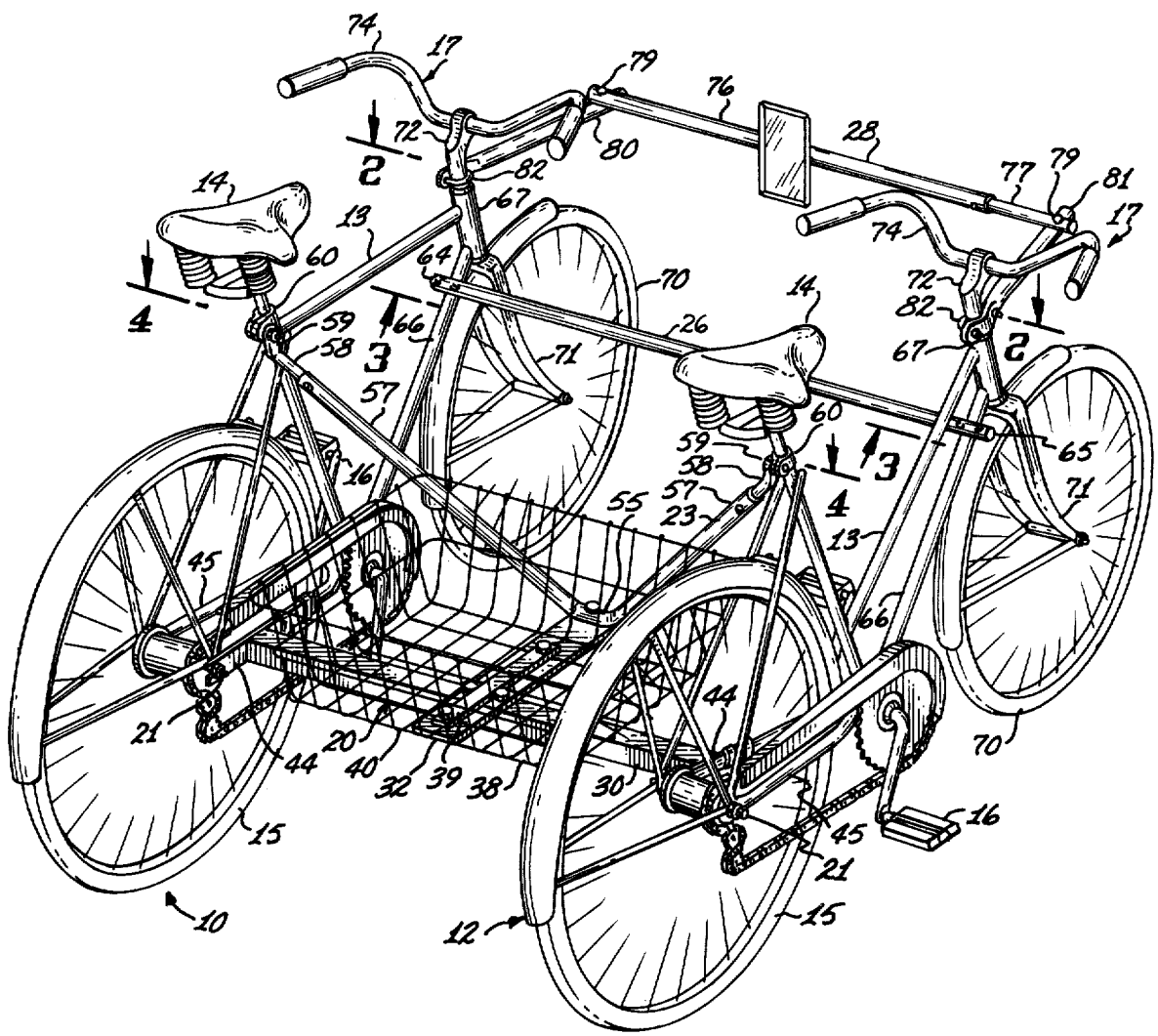
Fig-1
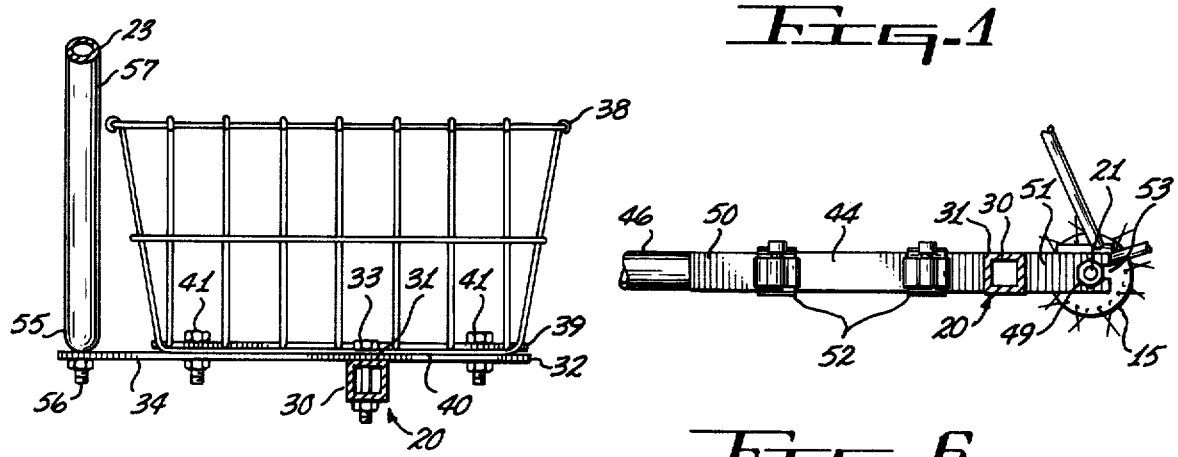
Fig-5
Fig-6

BICYCLE INTERCONNECTING APPARATUS

BACKGROUND OF THE INVENTION

1. Field of the Invention

This invention relates to bicycles and more particularly to an apparatus for side-by-side interconnection of two standard bicycles.

2. Description of the Prior Art

In many instances people who would like to ride a bicycle for transportation, exercise, and pleasure purposes refrain from doing so due to their dislike for riding alone and/or their lack of skills required to balance and steer such mechanisms.

Several types of velocipedes have been employed in attempts to overcome the above discussed reasons why some people do not ride a bicycle. One such mechanism is the well known tandem bicycle which does not enhance conversation and therefore is not particularly attractive to those people who dislike riding alone. Also, the balancing and handling characteristics of tandem bicycle are not materially improved over those same characteristics of a standard bicycle and the tandem bicycle cannot be converted to a conventional bicycle.

Adult size three wheel tricycles have become popular in recent times, and such structures of course, are inherently stable and therefore the need for acquiring the skill of balance is minimized. Such mechanisms to not solve the companionship problem and are considerably heavier than a bicycle due to the third wheel and the necessary frame and other structural devices. These mechanisms also are relatively expensive and cannot be converted to a conventional bicycle.

Several devices have been proposed for interconnecting standard bicycles in a side-by-side relationship, and such devices have not achieved commercial acceptance for various reasons. In general, devices for interconnecting standard bicycles in a side-by-side relationship have been relatively complex, expensive, and in some instances require modification of one or both of the bicycles. Such devices have also failed to take into account the various size differences which exist between different brands of so-called standard bicycles. Further, these prior art devices make no provisions for altering the steering geometry of the interconnected bicycles to achieve ideal steering and handling characteristics, and such devices are usually coupled to the bicycles in a fashion so that it is difficult to convert back to two disconnected standard bicycles if desired.

Therefore, a need exists for a new and improved bicycle interconnecting apparatus which solves some of the problems of the prior art.

SUMMARY OF THE INVENTION

In accordance with the present invention, an apparatus for side-by-side interconnection of two standard bicycles is disclosed as preferrably having four points of interconnection. The first interconnecting point is adjacent the respective rear axles of the bicycles, and the second interconnection is made adjacent the respective bicycle seats by a V-shaped interconnecting bar that is connected to the bicycle seats on its opposite ends and is connected intermediate its ends to the rear axle interconnecting bar. The V-shaped bar is adjustable as to its length to accommodate various sizes of bicycle frame structures. A third interconnecting bar couples the frames adjacent the front portions thereof. The steering mechanisms of the bicycles are interconnected with a tie rod that is adjustable to allow setting of the interconnected bicycle steering geometry to achieve ideal steering and handling characteristics.

Each of the coupling means employed to connect the interconnecting bars and the tie rod are of a suitable quick disconnect type which facilitates interconnection and decoupling of the bicycles.

The interconnecting bar which is adjacent the axles of the bicycles is of special construction which allows an article carrying basket to be mounted thereon. Accordingly, it is an object of the present invention to provide a new and improved apparatus for interconnecting a pair of standard bicycles in side-by-side relationship.

Another object of the present invention is to provide a new and improved apparatus for the side-by-side interconnection of a pair of standard bicycles with the apparatus being adjustable to allow for various dimensional differences of the bicycles.

Another object of the present invention is to provide a new and useful apparatus for the side-by-side interconnection of a pair of standard bicycles with that apparatus being adapted to facilitate simple coupling and decoupling of the bicycles.

Another object of the present invention is to provide a new and useful apparatus for the side-by-side interconnection of a pair of standard bicycles with that interconnection apparatus being adapted to support an article carrying basket.

A still further object of the present invention is to provide a new and useful apparatus of the above described character which employs an adjustable tie rod for interconnecting the steering mechanisms of the bicycles so that the steering geometry may be adjusted to achieve ideal steering and handling characteristics.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view of a pair of bicycles interconnecting in a side-by-side relationship with the interconnecting apparatus of the present invention.

FIG. 5 is a fragmentary sectional view taken on the line 5—5 of FIG. 4.

FIG. 6 is a fragmentary sectional view taken on the line 6—6 of FIG. 4.

DESCRIPTION OF THE PREFERRED EMBODIMENT

Figure 2:
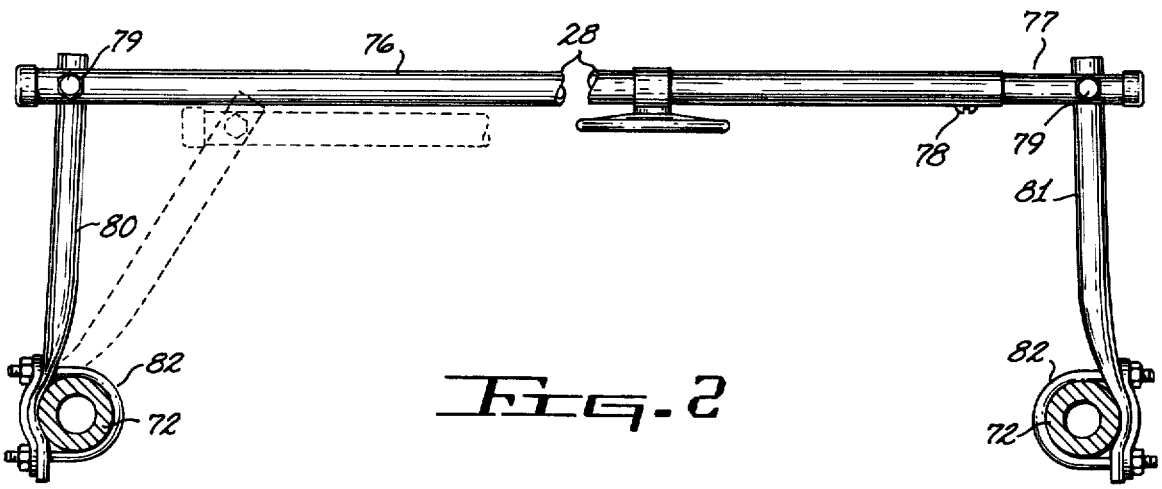
FIG. 2 is an enlarged fragmentary sectional view taken on the line 2—2 of FIG. 1.

Referring more particularly to the drawings, FIG. 1 illustrates a pair of standard bicycles which are indicated generally by the reference numerals 10 and 12, respectively.

Each of the bicycles has the usual frame 13, seat 14, rear wheel assembly 15, pedals 16, and steering mechanism 17.

As will hereinafter be described in detail, the apparatus of the present invention includes a first interconnecting bar 20 which interconnects the bicycles 10 and 12 adjacent the rear axles 21 thereof. A second interconnecting bar 23 couples the bicycles 10 and 12 adjacent their respective seats 14. A third interconnecting bar 26 interconnects the forward portions of the bicycle frames 13. And, an adjustable tie rod 28 is employed to interconnect the steering mechanisms 17 of the bicycles 10 and 12. thereto As seen best in FIGS. 1, 4, and 6, the first interconnecting bar 20 includes an elongated tubular member 30 of fixed length and which is preferably of square cross sectional configuration to provide an upwardly facing flat surface 31 to facilitate mounting of a flat plate 32 thereon. The flat plate 32 is affixed to the upper surface 31 of the tubular member 30 such as with suitable bolts 33, or the plate may be welded thereto. In any event, the flat plate 32 is located approximately intermediate the opposite ends of the tubular member 30 and is transverse thereto so as to provide a forwardly extending portion 34 and a rearwardly extending portion 35. An article carrying basket 38 of conventional wire construction is carried on the plate 32 and is demountably affixed thereto by a tie down strap 39. The tie down strap 39 is positioned to overlay a portion of the bottom 40 of the basket 38 and to coextend with the plate 32. The tie down strap 39 is demountably secured through the basket 38 to the plate 32 with suitable bolts 41, so that the portion of the bottom 40 of the basket 38 is gripped between the plate 32 and the tie down strap 39.

Each of the opposite ends of the tubular member 30 is provided with a transverse mounting strap 44, and those mounting straps 44 are employed to demountably couple the first interconnecting bar 20 to the bicycles 10 and 12 as will hereinafter be described in detail.

As is customary in the bicycle art, each of the bicycles 10 and 12 is provided with a bifurcated frame portion 45 having a pair of substantially parallel legs 46 which extend rearwardly from the pedals 16. The rear wheel assembly 15 of each of the bicycles 10 and 12 is journaled for rotation on the rear wheel axle 21 which is transversely secured to the rearwardly disposed free ends of the legs 46 by nuts 49.

Figure 4:
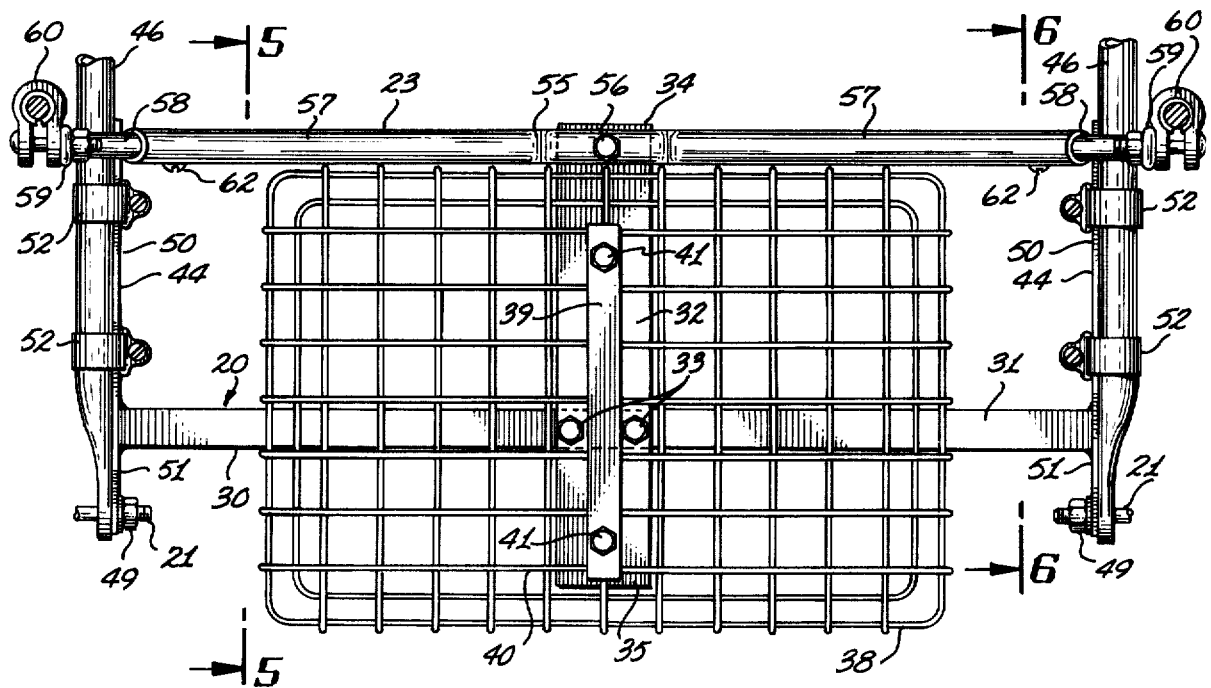
FIG. 4 is an enlarged fragmentary sectional view taken on the line 4—4 of FIG. 1.

As seen best in FIGS. 4 and 6, with the bicycles 10 and 12 placed in a side-by-side position and the first interconnecting bar 20 in place, the opposed mounting straps 44 of the bar 20 are in coextending contiguous engagement with the inwardly facing legs 46 of the bicycles. Each of the mounting straps 44 have a forwardly extending portion 50 and a rearwardly extending portion 51. The forward portions 50 of the mounting straps 44 are demountably coupled to the legs 46 such as with a pair of clamps 52. The rearwardly disposed portions 51 of the mounting straps 44 each have a horizontal rearwardly opening slot 53, one shown in FIG. 6, formed therein whereby the straps 44 may be slidingly demountably secured between the legs 46 and the axle securing nuts 49.

As hereinbefore described, the flat plate 32 carried on the tubular member 30 of the first interconnecting bar 20 has a forwardly extending portion 34, and as seen best in FIGS. 4 and 5 that portion 34 extends beyond the limits of the basket 38. The forwardly extending portion 34 of the flat plate 32 is employed as an attaching point for the second interconnecting bar 23 which as best seen in FIG. 1, is of V-shaped configuration. This second bar 23 has a substantially flat portion 55 intermediate its opposite ends and that flat portion 55 is secured to the plate 32 such as with a suitable bolt 56. A pair of angularly upwardly extending arms 57, which are integral with the flat portion 55, extend from the opposite ends of that flat portion to points adjacent the seats 14 of the bicycles 10 and 12. The flat portion 55 and the arms 57 are formed of a single hollow tubular member in each of the uppermost ends of which rods 58 are axially slidingly telescopically mounted. Each of the rods 58 has a flat 59 formed on the end thereof for attachment to the seat adjusting clamp 60 of the respective bicycles 10 and 12. The telescopically slidable mounting of the rods 58 to the arms 57 is provided so that variations in bicycle frame structures can be compensated for by increasing or decreasing the distance between the ends of the second interconnecting bar 23 as needed. Once the proper adjustment is made, the rods 58 are secured in place by any suitable means such as with screws 62 which pass through the tubular arms 57 into engagement with the rods 58.

The second interconnecting bar 23 is of V-shaped configuration and is attached as previously described to obtain improved structural rigidity over the strength that could be obtained if such an interconnection were made with a straight bar (not shown). Also, the V-shaped configuration of the bar 23 places that bar in a location where it will not interfere with pedal movements of the bicycles.

Figure 3:
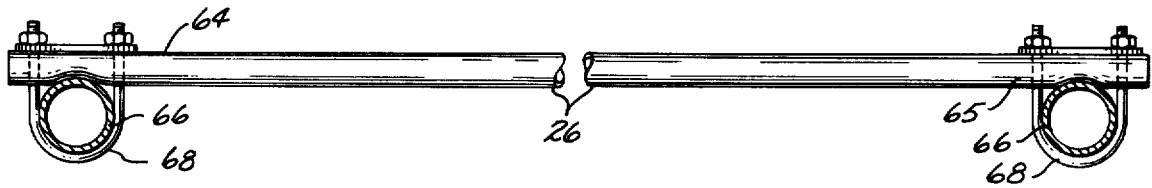
FIG. 3 is an enlarged fragmentary sectional view taken on the line 3—3 of FIG. 1.

The third interconnecting bar 26 is a fixed length tubular member the opposite ends 64 and 65 of which are demountably connected to the frames 13 of the bicycles 10 and 12, respectively. This transverse interconnection is ideally made on the frame members 66 of the bicycles which extend angularly upwardly from the pedal areas to the necks 67 located at the front of the bicycle frames 13. So as not to interfere with the normal pedaling of the bicycles, the third interconnecting bar 26 should be located at the forward ends of the frame members 66 adjacent the necks 67. Demountable interconnection of the bar 26 to the frame members 66 of the bicycles 10 and 12 may be made in any suitable fashion such as with U-bolts 68 as seen best in FIG. 3 of the drawings.

The bicycles 10 and 12 are provided with the usual steering mechanisms 17 each of which includes a front wheel 70 mounted in a fork 71, with that fork 71 journaled for rotation in the neck 67 of the frame 13. A handlebar post 72, sometimes referred to as a gooseneck, is coupled in the usual fashion to the fork 71 and projects upwardly from the neck 67 of the frame 13 and has the handlebar 74 connected thereto.

The steering mechanisms 17 of the bicycles 10 and 12 are interconnected by the tie rod 28, which as best seen in FIG. 2, includes a hollow tubular member 76 having a rod 77 axially slidingly movable therein. Thus, the length of the tie rod 28 may be changed by telescopically moving the rod 77 with respect to the tubular member 76. When the desired length of the tie rod 28 is achieved, as hereinafter will be described in detail, further telescopic movements are prevented such as by a sheet metal screw 78 which is mounted in the tubular member 76 and may be moved into engagement with the rod 77.

The opposite ends of the tie rod 28 are pivotably connected by suitable pivot pins 79 to the extending ends of the cranks 80 and 81. The cranks 80 and 81 are demountably connected to the handlebar posts 72 of the bicycles 10 and 12 such as with U-bolts 82.

It may now be seen that the steering mechanisms 17 of the bicycles 10 and 12 are interconnected as described above to operate as a single entity and turning movement applied by either rider of the bicycles will cause the front wheels to turn in unison.

As is well known particularly in the automotive arts, simultaneously steering of two spaced apart front wheels can be difficult and result in undesirable handling characteristics unless the steering geometry is set to establish certain relationships. Among these relationships, toe-in is of particular importance in achieving the desirable steering and handling characteristics of the interconnected bicycles 10 and 12. Therefore, the previously described adjustment feature of the tie rod 28 is employed to achieve the proper amount of toe-in. As hereinbefore described, axial sliding movement of the rod 77 relative to the tubular member 76 will change the length of the tie rod 28 which will alter the relationship of the cranks 80 and 81 with respect to each other, i.e., a parallel relationship can be achieved or they can be moved into a converging or diverging relationship as desired. Changes in the relationship of the cranks 80 and 81 will, of course, cause rotation of the forks 71 of the bicycles 10 and 12 which in turn will cause the front wheels 70 to move in a manner similar to the movement imparted to the cranks 80 and 81. It has been found that a toe-in of approximately ⅜ inch to ½ inch is ideal to produce the desired steering and handling characteristics in standard size bicycles.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What is claimed is:

1. An apparatus for interconnecting a pair of bicycles comprising:
    a) a pair of bicycles positioned in a side-by-side relationship, each of said pair of bicycles having a frame, a rear wheel axle, a seat and a steering mechanism;
    b) a first interconnecting bar extending between said pair of bicycles and coupled on the opposite ends thereof to the frames of said bicycles adjacent the rear wheel axles thereof;
    c) a second interconnecting bar extending between said pair of bicycles and coupled on the opposite ends thereof to said pair of bicycles adjacent the seats thereof, said second interconnecting bar comprising,
        a V-shaped hollow tubular member a portion intermediate the opposite ends of which is connected to said first interconnecting bar,
        a rod axially slidably mounted in each of the opposite ends of said V-shaped hollow tubular member for adjusting the length of said second interconnecting bar, each of said rods coupled to a different one of said pair of bicycles, and
        means on said V-shaped tubular member for optionally allowing axial sliding movement of said rods relative to said V-shaped tubular member; and
    means extending between the steering mechanisms of said pair of bicycles and connected thereto for causing the steering mechanisms to turn in unison, said means for interconnecting the steering mechanisms of said pair of bicycles being adjustable for setting the toe-in relationship of the steering mechanisms of said pair of bicycles.

2. An apparatus as claimed in claim 1 further comprising a third interconnecting bar extending between said pair of bicycles and coupled on the opposite ends thereof to the frames of said pair of bicycles adjacent the forward ends thereof.

3. An apparatus as claimed in claim 1 further comprising an article carrying basket supported on said first interconnecting bar.

4. An apparatus as claimed in claim 1 wherein said first interconnecting bar comprises:
    a. an elongated tubular member of fixed length the opposite ends of which are demountably coupled to said pair of bicycles; and
    b. a plate affixed to the upper surface of said elongated tubular member substantially intermediate the opposite ends thereof upon which an article carrying basket is mountable.

5. An apparatus as claimed in claim 1 wherein said means for interconnecting the steering mechanisms of said pair of bicycles comprises:
    a. a pair of cranks each of which is attached to a different one of the steering mechanisms of said pair of bicycles, each of said cranks having an extending end; and
    b. a tie rod of adjustable length pivotably connected on each of its opposite ends to the extending of said pair of cranks so that the steering mechanisms of said pair of bicycles will turn in unison.

6. An apparatus as claimed in claim 5 wherein said tie rod comprises:
    a. a hollow tubular member;
    b. a rod axially slidably mounted in said hollow tubular member for adjusting the length of said tie rod; and
    c. means on said hollow tubular member for optionally allowing the axial sliding movement of said rod relative to said hollow tubular member.

* * * * *